Patented Jan. 1, 1935

1,985,969

UNITED STATES PATENT OFFICE 1,985,969

EDIBLE FAT

Otto H. Alderks, William R. Distel, and James Earl Taylor, Cincinnati, Ohio, assignors to The Procter & Gamble Company, Cincinnati, Ohio, a corporation of Ohio No Drawing. Application June 15, 1931,
Serial No. 544,688

10 Claims. (Cl. 99—13)

This invention relates to hydrogenated vegetable oils, and specifically to methods of improving the keeping quality of edible fats made by hydrogenating vegetable oils.

Hydrogenated vegetable oils have been used extensively as edible fats and are superior to unhydrogenated oils in many respects, particularly in consistency and in the property of resisting the development of rancidity. In particular, hydrogenated cottonseed oil has been much used as a cooking fat because it combines an abundant supply with suitable consistency over the range of ordinary temperature, and with moderately high resistance to rancidity. However, it is highly desirable to increase the length of time during which hydrogenated cottonseed oil of suitable consistency may be kept without developing rancidity.

In comparison with cottonseed oil, sesame oil is less plentiful, and tends to yield a hydrogenated oil which is of inferior consistency as a cooking fat when used at different temperatures.

We have found that, by hydrogenating mixtures of sesame and cottonseed oil, the good consistency over the range of ordinary temperature of the hydrogenated cottonseed oil is retained, and the sesame oil imparts to the mixture in surprising degree a resistance to the development of rancidity.

Ordinarily when an oil or fat tending to turn rancid readily is mixed with an oil or fat which resists rancidity, the mixture follows the rancidity tendency of that oil or fat which more readily develops it. The keeping quality of unhydrogenated cottonseed oil, for example, is not appreciably improved when mixed with substantial proportions of fats highly resistant to rancidity, as is commonly done in the manufacture of so-called vegetable oil lard compound.

On account of the relative amounts of the two oils available, the most useful mixtures coming in the scope of our invention are those which contain more cottonseed oil than sesame oil. Our preferred range of composition is 10 to 50% sesame oil. However, we do not limit our invention to any particular proportions. We have found that any substantial addition of sesame oil to cottonseed oil results in a marked improvement in the keeping quality of the fat after hydrogenation to any given melting or congealing point. This marked improvement in keeping quality, it should be noted, is directly contrary to the result normally to be expected as indicated in the preceding paragraph.

For purposes of our invention, it is immaterial whether the two oils be mixed before or after hydrogenation, but in general it is more convenient to mix the oils before hydrogenation.

A further slight improvement in the keeping quality of the hydrogenated mixtures can be effected by the incorporation of relatively small percentages of other oils, such as soy bean, sunflower, corn, and peanut oils. Such additions are mentioned primarily as coming within the scope of our invention.

The degree of hydrogenation is determined by the desired physical properties of the final product, especially the melting point and the consistency at ordinary temperature. Our preferred product for general edible use is of lard-like consistency at ordinary temperatures, and lies within the range 60 to 80 iodine value. After hydrogenation it is understood that our product might be subjected to additional treatments commonly applied to edible oils, such, for example, as steam deodorizing, but such subsequent treatments are not a part of our present invention.

As a particular example, we cite the hydrogenation of a mixture of 80% refined cottonseed oil and 20% refined sesame oil to a melting point of 37° C. The consistency of this product, after solidification in the usual manner, is almost indistinguishable from that of cottonseed oil similarly processed, but its resistance to rancidity is markedly increased.

Having thus described our invention, what we claim as new and desire to secure by Letters Patent, is:—

1. An edible fat comprising hydrogenated cottonseed oil together with hydrogenated sesame oil as a stabilizer to retard rancidity of the fat.

2. The method of making a fat comprising cottonseed oil stable against rancidity which consists in mixing sesame oil with the cottonseed oil, and hydrogenating the mixture.

3. An edible fat of substantially lard-like consistency comprising a mixture of hydrogenated oils, of which at least 50 per cent consists of cottonseed oil and not less than 10 per cent consists of sesame oil serving to enhance the resistance of the cottonseed oil to rancidity.

4. An edible fat having an iodine value of not less than 60 nor more than 80, comprising 10 per cent to 50 per cent of hydrogenated sesame oil, the remainder being predominantly hydrogenated cottonseed oil, the sesame serving to enhance the resistance of the cotton seed oil to rancidity.

5. A plastic edible fat of less than 80 iodine value, consisting of about 20% hydrogenated refined sesame oil and about 80% hydrogenated refined cottonseed oil, the sesame oil serving to enhance the resistance of the cottonseed oil to rancidity.

6. In the manufacture of edible fat of substantially lard-like consistency, the step which consists of hydrogenating to less than 80 iodine value a mixture of fatty oils comprising not less than 10% nor more than 50% sesame oil, the remainder of said mixture being predominantly cottonseed oil, the sesame oil serving to enhance the resistance of the cottonseed oil to rancidity.

7. An edible fat of substantially lard-like consistency comprising a predominating proportion of hydrogenated cottonseed oil, with not less than 10% of hydrogenated sesame oil, whereby the resistance to rancidity is enhanced.

8. An edible fat of 60 to 80 iodine value comprising a predominating proportion of hydrogenated cottonseed oil, with not less than 10% hydrogenated sesame oil, whereby the resistance to rancidity is enhanced.

9. The method of stabilizing shortening which comprises adding thereto and thoroughly incorporating therewith a quantity of hydrogenated sesame seed oil.

10. As an article of commerce, a shortening product stabilized against rancidity consisting of a large proportion of a shortening and a complement of hydrogenated sesame seed oil.

OTTO H. ALDERKS.
WILLIAM R. DISTEL.
JAMES EARL TAYLOR.